July 25, 1950          W. H. KOHL          2,516,704
VACUUM GAUGE OF THE IONIZATION PRODUCING TYPE Filed June 11, 1949          3 Sheets-Sheet 1

WALTER H. KOHL
INVENTOR.

BY

John J. Rogan
ATTORNEY

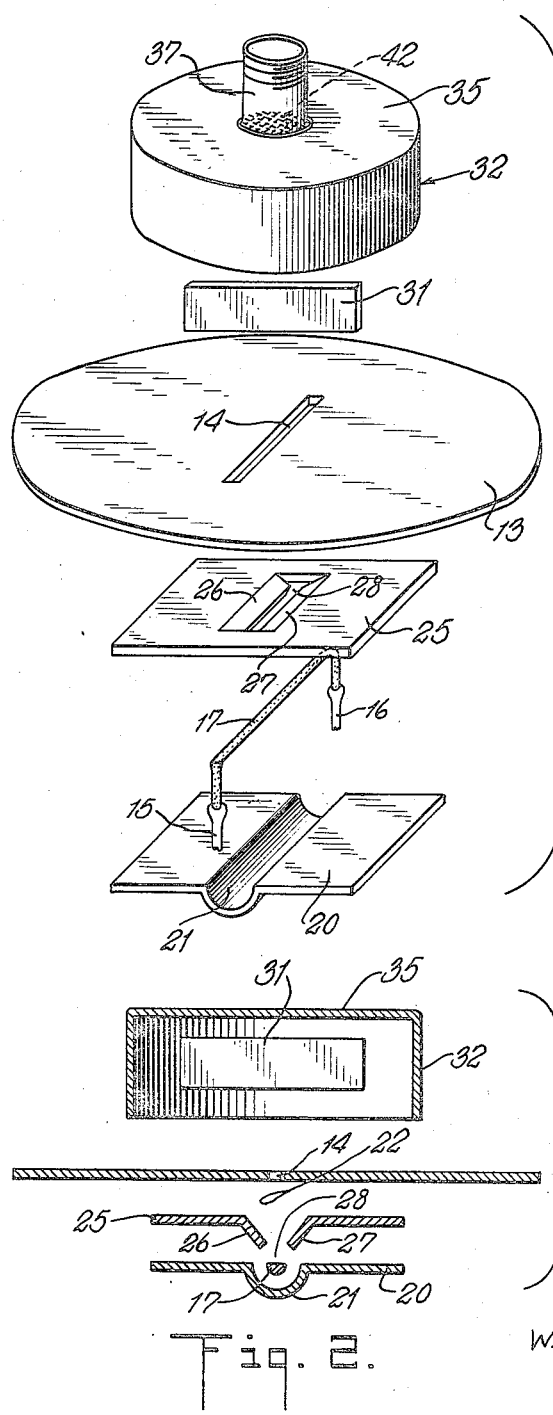

July 25, 1950 W. H. KOHL 2,516,704
VACUUM GAUGE OF THE IONIZATION PRODUCING TYPE
Filed June 11, 1949 3 Sheets-Sheet 3

WALTER H. KOHL
INVENTOR.

BY John J. Rogan
ATTORNEY

Patented July 25, 1950

2,516,704

UNITED STATES PATENT OFFICE 2,516,704

VACUUM GAUGE OF THE IONIZATION PRODUCING TYPE

Walter H. Kohl, Cedar Rapids, Iowa, assignor to Collins Radio Company, Cedar Rapids, Iowa, a corporation of Iowa Application June 11, 1949, Serial No. 98,438

11 Claims. (Cl. 250—27.5)

This invention relates to vacuum or pressure measurement, and more particularly to the measurement of vacuum or pressure through the intermediary of ionization.

A principal object of the invention is to provide an improved vacuum or pressure measuring arrangement, particularly suitable for use in measuring the degree of vacuum within electron discharge devices generally.

Another object is to provide an improved unitary device for measuring vacuum or pressure and arranged for external and removable arrangement to a chamber wherein the degree of vacuum or pressure is to be determined.

Another object is to provide an improved ionization gauge which is of sturdy mechanical construction and is designed for ready attachment to an opening in the wall of a chamber wherein the degree of vacuum is to be determined.

A feature of the invention relates to a novel ionization gauge device employing means to develop, externally of the chamber wherein the vacuum is to be determined, a beam of electrons which may be rectangular or ribbon-like in cross section, in conjunction with an ion collector which is disposed in substantially planar intersecting relation with the electron beam to allow maximum path for electron beams, thus making for high efficiency of electron production and efficiency of the ion production and collection.

Another feature relates to a novel ionization gauge device having a substantially linear cathode with a trough-like reflector in the rear thereof, a slotted trough-shaped beam forming electrode in front of the cathode, an accelerating anode having a slot opening in alignment with said cathode, and a substantially planar ion collector disposed in transverse intersecting relation with the remaining electrodes.

A further feature relates to an improved ionization gauge having a novel construction of electron gun and ion collector electrode.

A still further feature relates to the novel organization, arrangement and relative location and interconnection of parts which cooperate to provide an improved ionization gauge device for separable attachment to an evacuated chamber.

Other features and advantages not particularly enumerated, will be apparent after a consideration of the following detailed descriptions and the appended claims.

In the drawing which represents, by way of example, certain embodiments,

Fig. 2 is a sectional view of the electrode arrangement of Fig. 1, taken along the line 2—2 thereof.

Fig. 3 is an exploded view of the electrode arrangement of Fig. 1.

Figure 1:
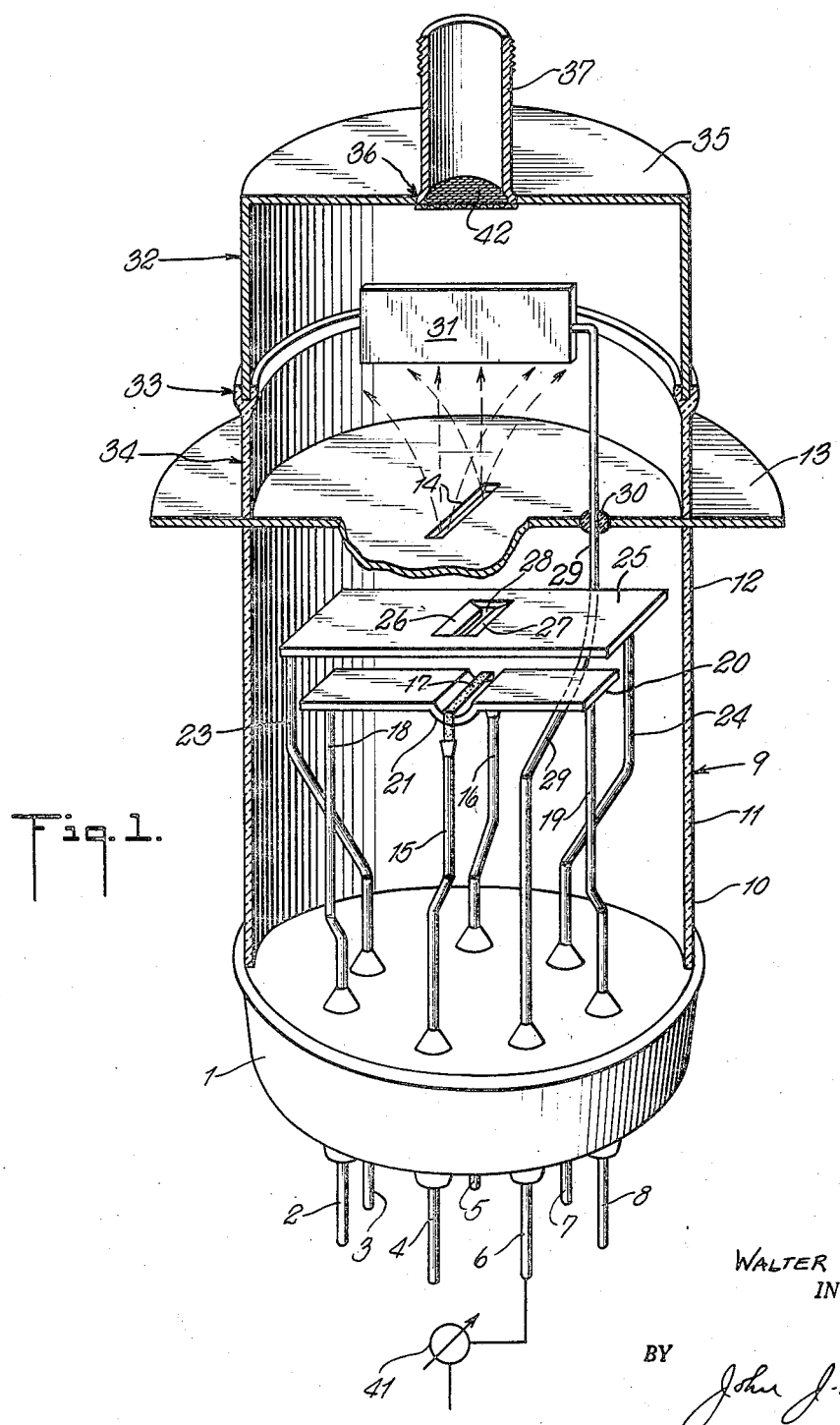
Fig. 1 is a perspective, and partially broken away, view of a device according to the invention.

The invention is in the nature of an improvement on the kind of vacuum or ionization gauge disclosed in copending application Serial No. 97,254, filed June 4, 1949.

Referring to the drawing, the numeral 1 represents a glass header which may be of any type well-known in the electron tube art. Merely for illustration, it is shown in the form of a glass cup through which are sealed in a vacuum-tight manner the various metal rods 2 to 8, whose external portions can serve as contact prongs for cooperation with a suitable receptacle for supplying the requisite potentials, and the inner portions of which serve as supports for the various electrodes to be described. Sealed to the rim of header 1 is a cylindrical glass member 9. Preferably, although not necessarily, the member 9 is formed in three sections 10, 11 and 12, suitably joined and sealed to each other to form in effect a graduated seal between the header 1 and the metal disc 13. The disc 13 may be of any well-known metal-to-glass sealing alloy, of which "Kovar" is typical, "Kovar" being an alloy consisting approximately of 29% nickel, 17% cobalt, 0.3% manganese, and the balance iron. The section 12 of member 9 can be of Corning Type 7052 glass manufactured by Corning Glass Works, Corning, New York, or any other glass which is capable of forming a vacuum-tight seal with the disc 13. Disc 13 is suitably positively biased so as to act as an electron beam forming an accelerating electrode, and is provided at its central region with a slot 14 through which the electron beam emerges in fan-like trajectories as represented by the dotted arrows.

Welded to the inner ends of prongs 4 and 5 are filament support wires 15, 16, for example of nickel, which in turn are welded to a straight or linear electron-emitting flat ribbon or round filament or cathode 17 which is disposed parallel to slot 14. Cathode 17 may be of any well-known kind which is capable of emitting electrons when heated to a suitable temperature.

Welded to the internal ends of prongs 2 and 8 are support wires 18, 19, for example of nickel, which in turn are welded to a metal plate 20, for example of nickel. The central region of plate 20 is formed with a trough-like depression 21 which may be curved in cross-section and symmetrically located in spaced relation beneath the cathode 17. Preferably, the plate 20 is mounted so that the flat wings thereof are substantially coplanar with the ribbon cathode 17 as indicated in Fig. 2. The plate 20 can be suitably negatively biased with respect to the cathode 17 so as to aid in focussing the electron beam 22 into a cross-section which is substantially rectangular. Welded to the inner ends of prongs 3 and 7 are support wires 23, 24, for example of nickel and to which is welded a metal plate 25 having its central region provided with downwardly inclined walls 26, 27, which define a linear slit 28, through which the electron beam passes, it being understood that the slit 28 is in alignment with the cathode 2 and with the slit 14. The plate 25 can be suitably biased with respect to the cathode so as to cooperate with the trough 21 to focus the beam more definitely to a rectangular cross-section so that when the beam reaches the slit 14, its cross-sectional size is slightly less than the cross-sectional size of the said slit 14.

Figure 4:
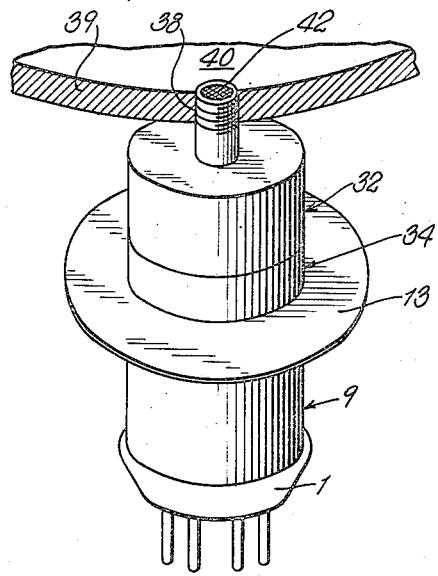
Fig. 4 is a view showing the manner of attachment of the gauge device of Fig. 1 to an evacuated chamber.

Welded to the inner end of prong 6 is a support wire 29 which passes upwardly through a suitable insulation bead 30 sealed into a corresponding opening in disc 13. Welded to the right-angled upper end of support wire 29 is a flat metal plate 31 which acts as the ion collector. In accordance with one feature of the invention, the plate 31 is mounted so that its plane extends transversely to the slot 14. The ion collector plate 31 is enclosed within a housing or cavity consisting of an inverted metal cap or cup 32 which may be of "Kovar" or similar sealing alloy, the rim of which can be sealed at 33 in a vacuum-tight manner to the corresponding rim of a cylindrical glass member 34 which may be of the same glass as the member 12 above described. The lower rim of glass member 34 is then sealed in a vacuum-tight manner to the upper surface of disc 13. The metal cup 32 is suitably positively biased with respect to the cathode 17 so as to act as an electron collector. The flat wall 35 has a central opening 36 and welded or otherwise sealed to the margin of this opening is a threaded pipe 37 which is arranged to be threaded into a corresponding opening 38 in the wall 39 of the chamber 40 (Fig. 4), wherein the vacuum or gas pressure is to be determined.

When the ionization gauge device above described is thus coupled to the said chamber 40, the latter is subjected to the usual evacuation schedule to bring the vacuum therein to the required degree. If there is an undesirable amount of residual gas within the chamber 40, a quantity thereof is diffused through the pipe 37 into the cavity defined by members 13, 34, 32 and 35. However, because of the relatively small slit 14 in the disc 13, the filamentary cathode 17 is not directly exposed to this residual gas, and therefore it is not subjected to undesirable contamination. The electron beam from the cathode 17 which emerges through the slit 14 fans out as indicated by the dotted arrows. The fanned-out electrons interact with the residual gas in the said cavity and cause the production of ions which are collected by the negatively charged plate 31. The amount of this ionization current, will in the well-known manner, be a function of the electron density in the electron beam and the amount of gas within the said cavity and therefore will be a function of the pressure within the chamber 40. The ion collector 31 can be connected in circuit with a suitable current meter 41 which can be directly calibrated in units of pressure or degrees of vacuum. Preferably, although not necessarily, the opening 36 in wall 35 is bridged by a foraminous or wire mesh member 42.

It will be seen that the gauge construction described above is a unitary device which can be readily attached to the chamber 40 under test. Furthermore, the filament or cathode 17 is protected from contamination by the gas within the chamber, and since the ion collector 31 is disposed within a relatively large cavity which is external to the chamber 40 under test, it provides a larger volume of ion-interaction space. Furthermore, by locating the source of the electrons outside the chamber 40, these electrons are prevented from bombarding elements of the structure within the chamber 40, where accumulation of electrostatic charges may be objectionable. The provision of the mesh 42 also decreases the likelihood of such bombardment.

Figure 5:
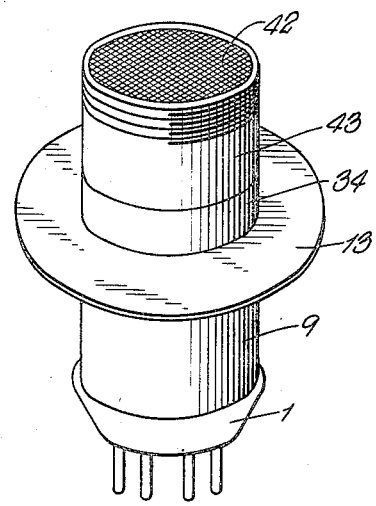
Fig. 5 is a modification of Fig. 4.

It will be understood of course, that instead of using a relatively small diameter pipe 37, a much larger diameter pipe 43 can be used (Fig. 5) and welded or otherwise sealed directly to the rim of member 34. Such an arrangement is shown in Fig. 5, wherein the parts corresponding to those of Fig. 1, bear the same designation numerals.

Figure 6:
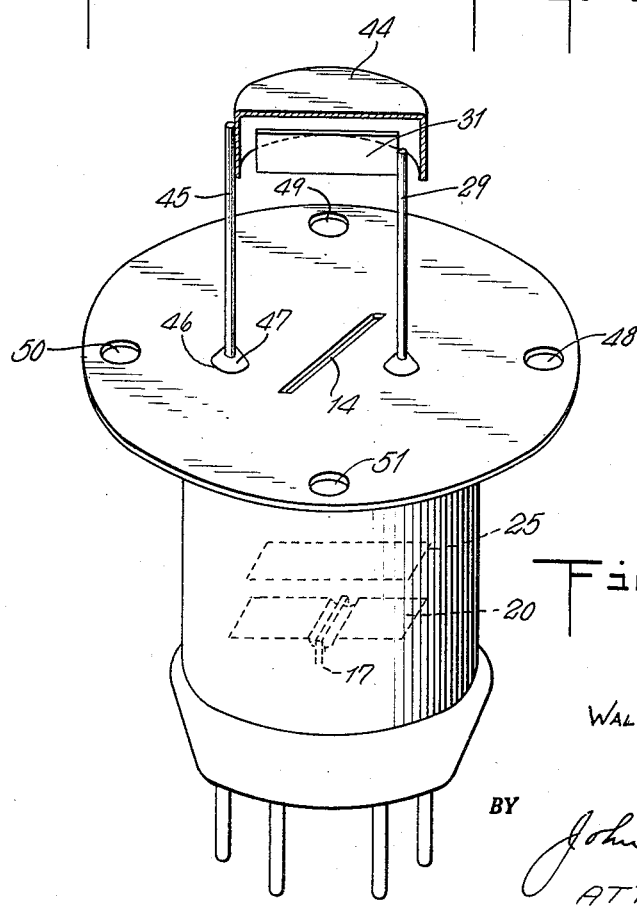
Fig. 6 is a modification of Fig. 1.

In some cases, it may be desirable to locate the ion collector electrode 31 internally of the chamber 40, while locating the electron beam-producing section externally of the chamber 40. Such an arrangement is disclosed in Fig. 6. In this figure, the parts which are identical with those of Fig. 1, bear the same designation numerals. However, in this embodiment, the metal electron collector cup 44, instead of being sealed to a glass member 34 is attached to a support rod 45 which insulatingly passes through an opening 46 in the disc 13 through the intermediary of a suitable insulation bead 47. In this embodiment, the disc 13 can be made of relatively thick metal or alloy stock having a series of openings 48, 49, 50, 51, by means of which the device can be bolted in a vacuum-tight manner to the wall 39 of chamber 40. With this arrangement therefore, the ion collector 31 and the electron collector 44 are located interiorly of the chamber 40 while the electron beam producing section of the device is located externally of the chamber 40.

As typical examples of potentials that may be employed, the cathode 17 may be at ground potential, the member 25 at +250 volts, the member 13 at +300 volts, the member 31 at −25 volts, and the member 32 at +250 volts.

While certain embodiments and certain materials have been disclosed herein, it will be understood that various changes and modifications may be made therein without departing from the spirit and scope of the invention. Thus while ion collector 31 is shown as a solid metal plate, it may be of wire mesh supported by a rectangular metal frame, or it may be a perforated flat metal plate or simply a wire loop of angular shape.

What is claimed is:

1. A device for determining the degree of vacuum within an evacuated chamber, comprising means to develop a beam of electrons, including an electron accelerating electrode having a slit for the passage of the beam, and a substantially planar ion collector electrode in the path of the electrons emerging from said slit, said ion collecting electrode being mounted with its plane in substantially edgewise relation to said slit for the purposes described.

2. A device for determining the degree of vacuum within an evacuated chamber, comprising an electron gun to develop a ribbon-like beam of electrons and including an accelerating anode having a slot through which the beam emerges, and an ion collector electrode mounted in edgewise relation to said slot for the purposes described.

3. A device for determining the degree of vacuum within an evacuated chamber, comprising a substantially linear electron-emitting cathode, electrodes to form said beam into a substantially ribbon-like conformation, a beam accelerating electrode having a slit approximating the cross-sectional area of said beam and through which the beam emerges, and an ion collector electrode mounted in intersecting relation with said slot for the purposes described.

4. A device for determining the degree of vacuum within an evacuated chamber, comprising a substantially linear electron-emitting cathode, an electron reflector in the rear of said cathode and having a trough substantially coextensive with said cathode, a beam focussing electrode having a slit aligned with said cathode, an electron accelerating electrode having a slit aligned with said cathode, and a substantially planar ion collector electrode mounted in edgewise relation to said slits.

5. An ionization gauge for attachment to a chamber wherein the degree of vacuum is to be determined, comprising electron gun means to develop an electron beam which is ribbon-like in conformation, means including an electron collector electrode in the form of an inverted metal cup carrying a tubular coupling member for coupling the gauge to said chamber, said cup defining a cavity into which the electron beam emerges, and an ion collecting electrode mounted in said cavity.

6. An ionization gauge according to claim 5, in which said ion collecting electrode is in the form of a substantially planar conductive member extending in edgewise intersecting relation with the transverse cross-section of said beam.

7. A unitary device for attachment to a chamber wherein the degree of vacuum is to be determined, comprising a housing divided into two sections separated by a disc having a narrow slit therein, electron gun means in one section to project a focussed beam through said slit into the other section, and an ion collector electrode in the form of a substantially flat metal plate mounted in said other section and disposed transversely to said slit and transversely with respect to the emerging electron beam.

8. A unitary device according to claim 7 in which said other section is formed in part of an inverted metal cup electron collector.

9. An ionization gauge for attachment to a chamber wherein the degree of vacuum is to be determined, comprising a tubular housing divided into first and second sections by a metal disc having a slit therein, electron gun means supported from one end of said housing within said first section, a substantially planar ion collector electrode mounted in the said second section and in edgewise relation with respect to the transverse cross-section of the electron beam from said gun.

10. An ionization gauge for attachment to a chamber wherein the degree of vacuum is to be determined, comprising a unitary assembly consisting of a tubular housing portion closed off at one end by a metal disc having a slit therein, electron gun means within said housing for developing a beam of electrons and projecting it through said slot, an ion collector electrode mounted in edgewise spaced relation to said slot on the opposite side of said disc from said gun, and means to support said assembly in a vacuum-tight manner on the wall of said chamber with said ion collector electrode located within the chamber and with said gun located outside the chamber, the last-mentioned means including a tubular metal member integrally united to said assembly and wherein said ion collector electrode is mounted, said tubular metal member having a threaded periphery for threading into a corresponding threaded opening in a wall of said chamber.

11. An ionization gauge according to claim 10 in which said tubular member is in the form of an inverted metal cup having an opening bridged by a grid, and a threaded tubular extension in alignment with said grid, for threading into said opening in the chamber wall.

WALTER H. KOHL.

REFERENCES CITED

The following references are of record in the file of this patent:

UNITED STATES PATENTS

| Number    | Name     | Date          |
|-----------|----------|---------------|
| 2,232,030 | Kallmann | Feb. 18, 1941 |
| 2,445,811 | Varian   | July 27, 1948 |